United States Patent Office 3,057,635
Patented Oct. 9, 1962

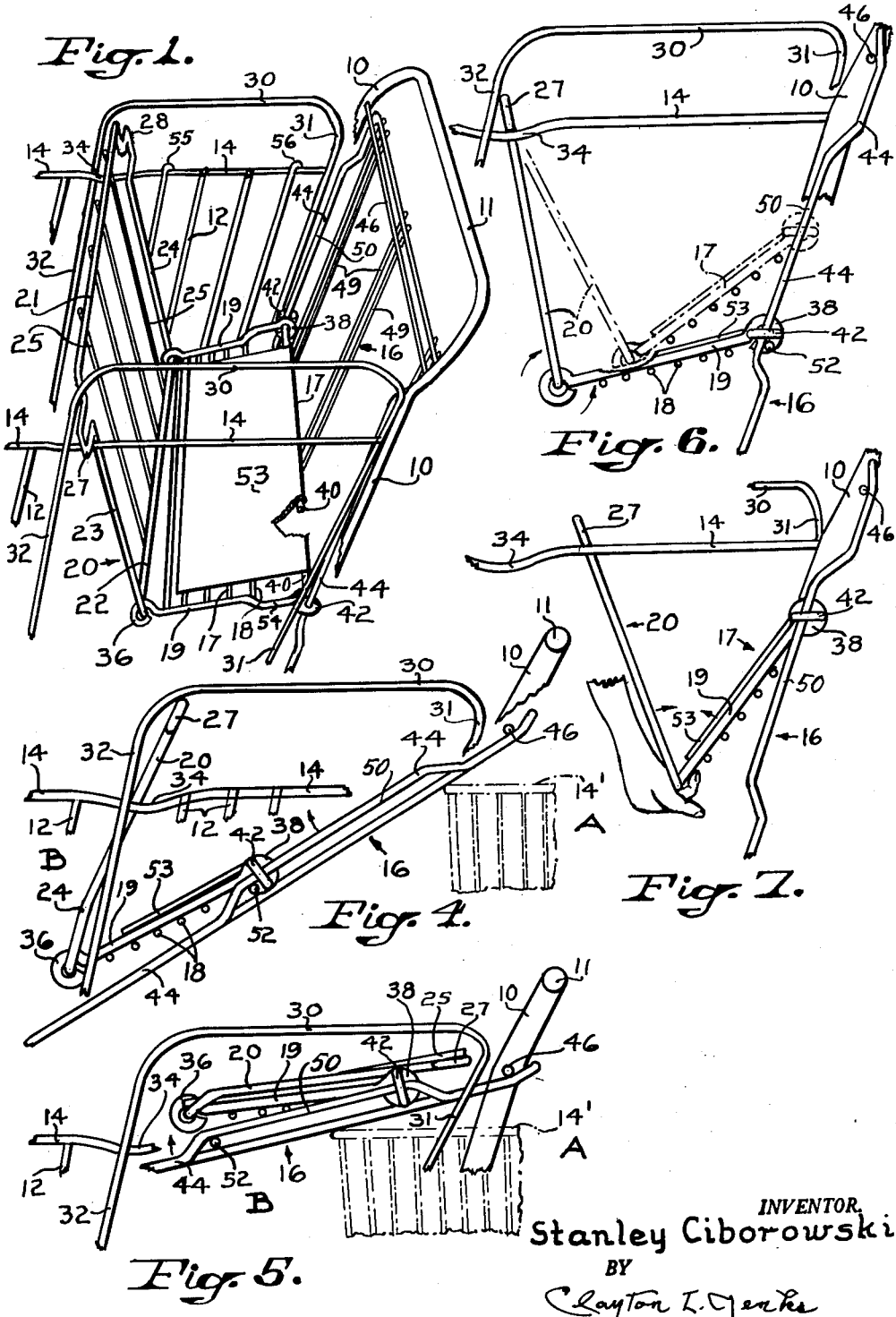

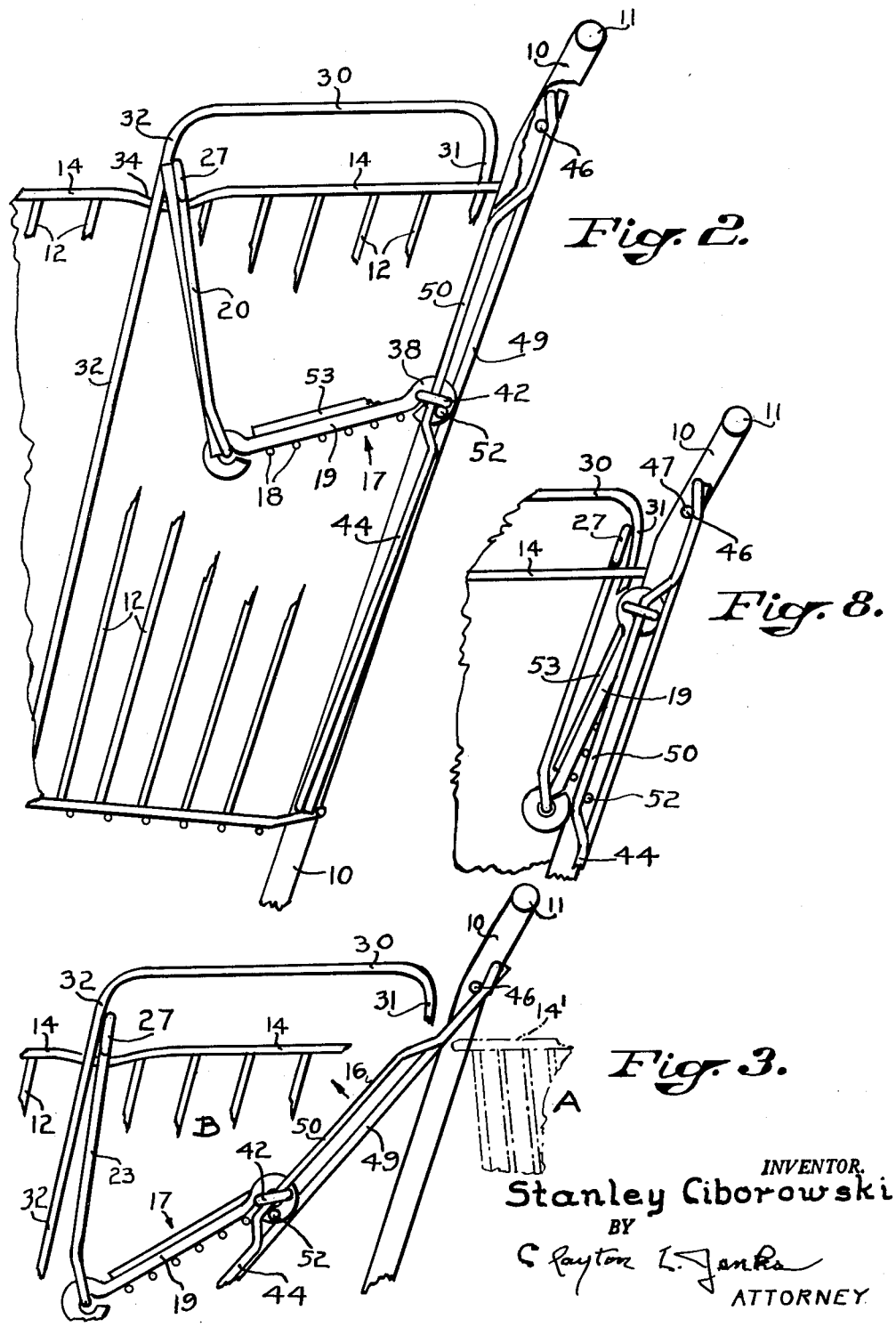

3,057,635
NESTING MARKET CART HAVING A
COLLAPSIBLE SEAT
Stanley Ciborowski, Worcester, Mass., assignor to Parker Metal Goods Company, Worcester, Mass., a corporation of Massachusetts
Filed Dec. 19, 1960, Ser. No. 76,535
8 Claims. (Cl. 280—33.99)

This invention relates to a nesting market cart having a collapsible seat for a child, and more particularly to a grocery cart of the general type shown in the patent to Hoedinghaus et al., No. 2,813,725 of November 19, 1957.

This type of market cart is so shaped that it may be nested with other like carts, and for that purpose it has a rear swinging gate so arranged that the gate will be lifted out of the way be another cart telescoping therewith. It is customary to provide such a cart with a seat for a child so constructed that the seat may be manually moved to an inoperative position or, in the act of telescoping two carts, it may be automatically lifted to permit nesting of the carts. This type of cart is comparatively expensive to manufacture and it should give a long life of useful service. It, however, is found that many prior constructions require a considerable impact to nest two carts, and this necessarily tends toward damaging the movable gate and seating structure. This should be avoided. Also, it is important that the seat be so constructed and supported that a child may be carried safely and comfortably and yet the seat may be easily folded to an inoperative position either manually or by a cart nesting operation. It is further desirable that the seat supporting structure does not obstruct or interfere with the use of the maximum basket capacity.

The primary object of this invention is to satisfy such requirements and provide a construction which is such that carts may be readily nested without requiring a great effort by the user, and whereby the seat and gate may be moved to inoperative or nested positions without a damaging impact to the gate and seat parts.

Another object is to provide a seat which is so mounted and balanced that it may be readily moved to a nesting position and a forcible telescoping of two carts can not throw the seat to a position of interference with the cart handle or other parts of the structure while the seat supports remain in confined positions both when the seat is operative and when the seat is folded.

Another object is to so mount the seat that its back is suspended from and slidably supported by the top portion of the basket frame and it cannot be bent out of position by a careless handling of the cart.

Another object is to provide a construction whereby the seat may be used for storage of small articles or it may be manually folded away so as to permit full use of the cart storage space.

Other objects will be apparent in the following disclosure.

Referring to the drawings illustrating one embodiment of this invention:

FIG. 1 is a fragmentary perspective view of the rear seat portion of the shopping cart but with parts of the near side wall removed;

FIG. 2 is a fragmentary enlarged somewhat diagrammatic side elevation of the rear portion of the cart, the near side parts being broken away to show the seat and associated members, the seat and the gate being in their normal positions of use;

FIG. 3 is a fragmentary view similar to FIG. 2, but showing in dot and dash outline the position of a second cart when said second cart automatically starts to swing the gate towards a nesting position;

FIG. 4 is a fragmentary diagrammatic side elevation of the rear portion of the cart showing in dot and dash outline how a second cart lifts the swinging gate further than shown in FIG. 3 and folds the seat;

FIG. 5 is a view similar to FIG. 4 showing the gate lifted and the seat folded in nearly their final lifted positions;

FIG. 6 is a diagrammatic fragmentary side elevation, similar to FIG. 4, showing the first stages of manually folding the seat to an inoperative position;

FIG. 7 is a view similar to FIG. 6 showing the second stage of folding the seat; and FIG. 8 is a fragmentary side elevation, similar to FIG. 4, showing the seat in a folded and stable position while the gate is down.

A shopping cart as shown in the drawings may comprise the usual cart structure such as shown in said patent and to which reference may be had for further details of the construction, except as hereinafter set forth. The cart comprises two substantially vertical tubular frame members 10 connected by a handlebar 11. A grocery supporting basket suitably mounted on the frame comprises substantially vertical rods 12 welded or otherwise fastened at their tops to a substantially horizontal rod 14 of the basket frame. It is to be understood that the terms "vertical" and "horizontal" are used loosely herein to define the general arrangement of the parts and that the actual construction may comprise a tapered basket and associated parts including rearwardly sloping and depending frame members 10, as is illustrated in said patent, and that the basket and other constructional features of the cart are so made that a set of carts may be telescoped, one with another in accordance with standard practice. The present invention pertains primarily to the construction of a folding seat and a swinging gate which permits the telescoping action. The basket and handle parts of the cart are suitably supported on a lower frame mounted on wheels, which are not shown for the sake of simplicity and clarity of illustration.

The subject matter of this invention comprises a swinging gate, indicated generally by the numeral 16, and a folding seat 17 arranged for supporting a child. The seat bottom comprises horizontal rods 18 welded to side bars 19. The back of the seat has a peripheral frame 20 shaped in a substantially rectangular configuration. This frame comprises a top horizontal cross bar 21 and a bottom bar 22 parallel therewith which are continuous with side members 23 and 24. Vertical rods 25 are welded at their tops and bottoms to the frame members 21 and 22 and are spaced to provide a satisfactory back for a child to lean against. The seat back may be normally tilted forwardly, or away from the handle 11 at the rear of the cart, and at a slight angle to the vertical to support a child comfortably.

The side members 23 and 24 of the back are shaped near their tops to form laterally extending U-shaped ears 27 and 28. These ears normally rest slidably on the top surfaces of the horizontal rods 14 of the basket. Hence, the under portion of each of these ears constitutes a support for the back 20 of the seat as well as the associated parts. The framework of the basket comprises a further substantially horizontal rod member 30 located above and preferably parallel with and spaced from the rod 14 at the rear of the seat back. In the drawings, the handle 11 and gate 16 are at the back and the basket is at the front of the cart. The horizontal members 30 are preferably made integral with a rear substantially vertical rod 31 near the frame member 10 and a front vertical rod 32 which extend downwardly and form parts of the two sides of the grocery basket.

Each of the horizontal rods 14 is shaped to provide a dip or depression 34 (FIG. 2) located opposite and largely at the rear of the adjacent downwardly extending member 32 of the frame. The parts 14 and 32 are welded together, and the ears 27 and 28 of the seat back normally rest in the depressions 34 where they engage the downwardly extending rods or legs 32 of the framework. The depressions 34 serve somewhat as cams in the folding operation of the seat as later described, and they normally cause the ears 27 and 28 to rest at the bottom of the depressions 34 where they lean against the vertical frame rods 32. Since the horizontal rod members 30 and 14 are substantially parallel and spaced one above the other by a distance greater than the heights of the loops 27 and 28, the latter are limited in their movement thereby, so that the seat back frame is necessarily confined in its movement by the members 14 and 30 as well as the depending rods 32 during use and the operation of folding the seat parts to an inoperative position either manually or automatically when two carts are nested.

The two side rods 19 of the seat on which a child may be carried have pivot eyes 36 formed at their front ends which wrap around and pivot on the horizontal rod 22 of the back frame. At their rear ends, the side rods have eyes 38 which similarly are wrapped around and pivot on a movable horizontal cross rod 40. That rod 40 has eyes 42 on its ends which slide on two depending or vertical end rods 44 of the hinged gate. These rods are bent as shown to provide clearance for the sliding eyes in front of the rods of the gate.

The gate comprises the substantially parallel rods 44 which are perpendicular to they axis about which the gate pivots. It has an upper horizontal cross rod 46 connected, as by welding, to the rods 44. The two cylindrical ends of the rod 46 are mounted in horizontal sockets 47 drilled only through the inner side portions of the vertical tubular frame members 10 and thus form pivots about which the gate swings. The lower ends of the guide members 44 may be free or connected by a cross rod (not shown) suitably welded thereto. Thus the gate comprising the two side members 44 and their pivot rod 46 may swing on the pivot bars 46 pivoted in the sockets of the side members 10 of the frame. The top member 46 is positioned well above the framework of another basket, indicated by dot and dash lines in FIG. 4, so that when two carts are nested, the basket of the rear cart may swing the gate about its pivot ends 46 to the position of FIG. 5. The gate also comprises suitably spaced vertical rods 49 (FIG. 1) so arranged that the legs of a child sitting on the seat may be thrust through the spaces thus provided, as is common practice.

The vertical gate rods 44 have forwardly projecting loop portions 50 (FIG. 2) which provide straight slide ways for the eyes 42 of the cross rod 40 of the seat. Near the lower ends of the slide ways 50 is a cross rod 52 welded to the gate frame members 44 and below the eyes 42 so arranged that the ends of the rod 52 constitute stops limiting the downward movement of the seat supports 19. Said seat supports have downwardly projecting depressions 54 (FIG. 1) which provide clearance for the parts when the carts are nested.

The seat has cross rods 18 suitably welded at their ends to the side members 19 to form a satisfactory supporting structure. In order to provide a smooth surface for a child to sit on, there is an over seat 53 formed of molded resin or metal which is shaped at its rear end to form a pivot bearing mounted on the cross rod 40 of the seat. The over seat is free at its forward edge, and it is thus so mounted that it may pivot freely when the seat is lifted into an inoperative position. This over seat is sized to cover the openings between the rods 49, so that the seat may be left in an operative position, but with the over seat folded up and the user of the cart may store small or breakable articles in the seat space.

It will now be appreciated that the seat bottom is pivotally connected at 36 to the back 20 and that the front of the seat has the loops 42 slidably mounted on the slideways 50 of the gate rods 44. The back of the seat is held in position only by the projecting ears 27 and 28 of its frame slidably resting on the horizontal rod 14 of the basket. Hence, the seat is strongly mounted for use but may be readily folded manually to an inoperative position. Also, as shown in FIG. 1, one of the vertical rods 12 may extend above and around the top basket rod 14 to form a low bump 55 which will normally serve as a lock to prevent the seat back from moving away from its operative carrier or child supporting position to a material extent. If desired, a similar bump or lock 56 may be provided in front of the ears 27, 28 to urge or hold them into the inoperative folded positions of FIG. 8. The ears may, of course, be moved manually or automatically over the humps.

The operation of nesting two carts is best shown in FIGS. 3, 4 and 5 in which the front end of the second cart A is shown in dot and dash outlines at the right of the cart B, which has been described above. The basket comprising the top frame rods 14 of the cart B is tapered as set forth in said patent, so that the front end of the basket A will nest therewith. In that operation, rods 14' of the top basket of cart A (FIG. 3) move up between the handle supports 10 of cart B and strike the rods 44 and other parts of the swinging gate and thus swing the gate from the position of FIG. 2 gradually upwardly through the positions of FIGS. 3, 4, and 5 to a final position in which the two baskets are fully nested and the various parts of the gate are held substantially horizontal and resting on the top of the horizontal frame rods 14' of the second basket. The seat in its normal useful position slopes upwardly toward the rear, and the eyes 42 of the cross rod 40 which carries the rear portion of the seat normally remain in contact with the cross rod 52 while the seat is lifted by the gate pivoting upwardly thereabout. The seat back 20 is lifted so that the ears 28 are raised above the supporting rod 14 (FIG. 4) but they can not escape past the confining top rod 30 thereabove. Hence, these ears slide toward the rear and along the underside of rod 30 so that they are cammed into the collapsed position shown in FIG. 5. That is, the various parts, the gate 16, the seat 17, and the back 20 are now substantially parallel above the basket of the second cart A. When the carts are pulled apart, the gate drops in the reverse direction of the indicated arrows of FIGS. 4 and 5, and as this takes place, the ears 27 and 28 fall back into contact with the basket top 14. The swinging motion of the gate draws the seat 17 forward to a position where the ears 27 and 28 are cammed back by the sloping surface 34 into contact with the depending cross rods 32 of the upper frame so that the seat assumes the normal sloping position indicated in FIG. 1. The imperforate over seat plate 53 is hinged on the rod 40 (not shown in FIGS. 3, 4, and 5) which carries the front end of the seat 17 and it follows the movement of the seat 17. Since the pivot for the over seat is located near but slightly spaced from the rods 49 of the gate the over seat may be swung upwardly to close the leg openings and will lean rearwardly against the gate and remain stationary.

The operation of manually folding the seat is illustrated in FIGS. 6, 7, and 8. The shopper standing near the handle 11 reaches forward and grasps the cross bar 22 of the seat back (FIG. 7) and with a rearward motion, as indicated by the arrows in FIG. 6, causes the bottom of the seat to swing upwardly about the seat back and the eyes 42 to slide up the portion 50 of the rod 44. The ears 27 and 28 remain in sliding contact with the basket rod 14 and move rearwardly along the rod until the back 20 pivotally folds against the seat portion 17 with the ears 27 and 28 in contact with the vertical rod 31 of the upper frame as is indicated in FIG. 8. The imperforate plate 53 has at the same time folded into place against the gate and closes off the leg holes between the rods 49. FIG. 5 shows that if the seat has been previously folded to the position of FIG. 8, the nesting operation will leave the seat in that position and lift it to the substantially horizontal arrangement. The seat slopes upwardly towards the gate, as shown, so that a rearward movement of the back automatically forces the seat rail loops 42 up the slide way 50.

Various advantages in this construction will now be appreciated. The manual folding of the seat involves a rearward movement which causes the seat parts to lift into place with but little effort by the operator. When the gate is swung back at the end of a nesting operation, the ears 27 and 28 are cammed by the depression 34 to move the seat back into a correct position for supporting a child. These ears serve during nesting to prevent the seat parts from being thrown over the handle bar 11, as might be the situation if they were not restrained by the top frame rod 30. Since the seat back is supported at its top by the ears resting on the basket rods 14, the seat back can not be bent by careless handling, as would be the case if the seat were secured by a support only at its bottom. Hence, a primary feature of this invention relates to supporting the seat from the top of the basket or equivalent structure in a dependent fashion. Other advantages will be apparent to one skilled in the art.

It will now be appreciated that various modifications may be made within the scope of this invention and that the disclosure of a preferred embodiment is not to be interpreted as imposing limitings on the appended claims.

I claim:

1. A nestable market cart comprising a frame, a basket thereon having side and front walls shaped for nesting with a similar basket of another cart, a swingable gate pivotally mounted near its top on the frame and forming a rear wall of the basket, a folding support for a child having a back and a seat which are pivotally connected together, said basket having upper slide rails, said seat back having projecting ears supported by and freely movable along said slide rails, a stop on the basket frame which limits the frontward sliding movement of the seat back ears and holds the back in an upright position, a slide rod on the gate, a slide member on the seat remote from its pivotal connection with the back and supported by the slide rod for a limited sliding movement therealong and providing for a manual folding of the seat and its back to an inoperative position adjacent the gate and a stop on the gate which supports the adjacent portion of the seat in its operative lowermost position, said ears forming the sole support for the seat back and said seat back and stop on the gate forming the sole support for the seat.

2. A cart according to claim 1 comprising substantially horizontal rods located above the upper slide rails and upright members which confine the seat back ears and permit a sliding movement of the ears along the rails and only a limited upward movement thereof.

3. A nestable market cart comprising a frame, a basket thereon having a front and sides shaped for nesting with another cart and having opposed upper slide rails, a swingable gate forming a rear wall of the basket, pivots near the top of the gate which are mounted on the frame for a swinging movement of the gate, a support for a child having a back and a seat pivotably connected together and arranged to be folded into proximity with each other and said gate, means for supporting the seat back solely on and for a free sliding movement along said slide rails, upright slide rods on the gate, means for pivotably and slidably supporting the front of the seat on said rods so that the seat is supported jointly by the gate and the slide rails and the seat will be lifted to a folded position when the gate is pivotally moved by a nesting operation and stop means which limit forward movement of the back and downward movement of the seat for holding said seat and back in a child supporting position.

4. A cart according to claim 3 in which the slide rails include a part which cams the back forwardly and releasably holds the back normally in a child supporting position.

5. A cart according to claim 3 in which the slide rails include humps shaped to releasably hold the seat back alternatively in a normal carrier position or in a folded arrangement adjacent to the gate.

References Cited in the file of this patent

UNITED STATES PATENTS

| | | |
|---|---|---|
| 2,813,725 | Hoedinghaus et al. | Nov. 19, 1957 |
| 2,837,345 | Young | June 3, 1958 |
| 2,856,194 | Dumsha | Oct. 14, 1958 |
| 2,911,227 | Davis | Nov. 3, 1959 |
| 2,964,326 | Schray | Dec. 13, 1960 |